(12) United States Patent
Petite

(10) Patent No.: US 6,914,893 B2
(45) Date of Patent: Jul. 5, 2005

(54) SYSTEM AND METHOD FOR MONITORING AND CONTROLLING REMOTE DEVICES

(75) Inventor: Thomas D. Petite, Douglasville, GA (US)

(73) Assignee: StatSignal IPC, LLC, Atlanta, GA (US)

( * ) Notice: Subject to any disclaimer, the term of this patent is extended or adjusted under 35 U.S.C. 154(b) by 824 days.

(21) Appl. No.: 09/812,044

(22) Filed: Mar. 19, 2001

(65) Prior Publication Data

US 2003/0067889 A1 Apr. 10, 2003

Related U.S. Application Data

(63) Continuation of application No. 09/704,150, filed on Nov. 1, 2000, and a continuation-in-part of application No. 09/439,059, filed on Nov. 12, 1999, and a continuation-in-part of application No. 09/412,895, filed on Oct. 5, 1999, and a continuation-in-part of application No. 09/271,517, filed on Mar. 18, 1999, and a continuation-in-part of application No. 09/172,554, filed on Oct. 14, 1998, and a continuation-in-part of application No. 09/102,178, filed on Jun. 22, 1998

(60) Provisional application No. 60/224,043, filed on Aug. 9, 2000.

(51) Int. Cl.⁷ .............................................. H04Q 7/24
(52) U.S. Cl. ...................... 370/338; 370/310; 370/328; 370/401
(58) Field of Search ................................ 370/338, 310, 370/310.2, 312, 313, 315, 328, 400, 401

(56) References Cited

U.S. PATENT DOCUMENTS

| | | | |
|---|---|---|---|
| 5,590,179 A | 12/1996 | Shincovich et al. ........ 379/107 |
| 5,604,869 A * | 2/1997 | Mincher et al. ............ 709/232 |
| 5,619,192 A | 4/1997 | Ayala ..................... 340/870.02 |
| 5,897,607 A | 4/1999 | Jenney et al. .................. 702/62 |
| 5,963,650 A | 10/1999 | Simionescu et al. .......... 380/49 |
| 6,087,957 A | 7/2000 | Gray ..................... 340/825.54 |
| 6,246,677 B1 | 6/2001 | Nap et al. .................... 370/346 |
| 6,362,745 B1 * | 3/2002 | Davis ......................... 340/637 |
| 6,366,217 B1 | 4/2002 | Cunningham et al. . 340/870.31 |
| 6,735,630 B1 * | 5/2004 | Gelvin et al. ............... 709/224 |

* cited by examiner

*Primary Examiner*—Phirin Sam
(74) *Attorney, Agent, or Firm*—Troutman Sanders LLP; Ryan A. Schneider; James Hunt Yancey, Jr.

(57) ABSTRACT

The present system is directed to a computerized system for monitoring and controlling remote devices by transmitting data between the remote systems and a gateway interface via a packet message protocol system. The system comprises one or more remote sensors to be read and possibly one or more actuators to be remotely controlled. The remote sensor (s)/actuator(s) then interface with uniquely identified remote transceivers that transmit and/or receive data. If necessary in individual applications, signal repeaters may relay information between the transceiver(s) and the gateway interface. Communication links between the remote transceivers and the gateway interface are preferably wireless but may also be implemented via a mixture of wireless and wired communication links. To successfully communicate between the transceiver(s) and the gateway interface, the present invention receives a plurality of RF signal transmissions containing a packet protocol via RF signals that includes sender and receiver identifiers, a description of the packet itself, a message number, any commands, the data, and an error detector. In addition, the packet protocol can be easily integrated with alternate data communication protocols for use with systems other than the Internet.

44 Claims, 9 Drawing Sheets

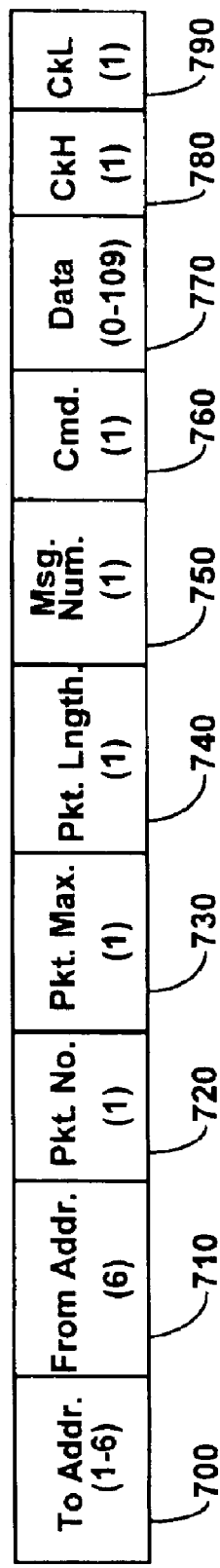
FIG. 7   Message Structure

FIG. 8

| "To Address" | Byte Assignment: |
|---|---|
| MSB - Byte 1<br>Device Type | FF-F0 (16) - Broadcast All Devices (1 Byte Address)<br>EF-1F (224) - Device Type Base (2 to 6 Byte Address)<br>0F-00 (16) - Personal Transceiver Identification (6 Byte Address) |
| Byte 2<br>Mfg./Owner<br>ID | FF-F0 (16) - Broadcast all Devices (Byte 1 Type)<br>(2 Byte Broadcast Address)<br>EF-00 (240) - Mfg./Owner Code Identification Number |
| Byte 3<br>Mfg./Owner<br>Extension ID | FF-F0 (16) - Broadcast all Devices (Byte 1 & Byte 2 Type)<br>(3 Byte Broadcast Address)<br>EF-00 (240) - Device Type/Mfg./Owner Code ID Number |
| Byte 4 | FF-F0 (16) - Broadcast all Devices (Byte 1 & Byte 2 Type)<br>(4 Byte Broadcast Address)<br>EF-00 (240) - ID Number |
| Byte 5 | (FF-00) 256 - Identification Number |
| Byte 6 | (FF-00) 256 - Identification Number |

Sample Messages

Central Server to Personal Transceiver - Broadcast Message - FF (Emergency)

Byte Count = 12 — 910

| To Addr. (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

---

First Transceiver to Repeater (Transceiver)
Broadcast Message - FF (Emergency)

Byte Count = 17 — 920

| To Addr. (F0) | From Addr. (12345678) | Pkt. No. (00) | Pkt. Max. (00) | Pkt. Lngth. (11) | Cmd. (FF) | Data (A000123456) | CkH (03) | CkL (A0) |
|---|---|---|---|---|---|---|---|---|

Note: Additional Transceiver Re-Broadcasts do not change the message. The messages are simply received and re-broadcast.

---

Message to Device "A0" From Device "E1"  Command - "08" (Respond to PING)
Response will reverse "To" and "From" Addresses Byte Count = 17 — 930

| To Addr. (A012345678) | From Addr. (E112345678) | P # (00) | P Max. (00) | P Lngth. (11) | Cmd. (08) | Data (A5) | CkH (04) | CkL (67) |
|---|---|---|---|---|---|---|---|---|

FIG. 9

SYSTEM AND METHOD FOR MONITORING AND CONTROLLING REMOTE DEVICES

CROSS-REFERENCE TO RELATED APPLICATIONS

This application is a continuation-in-part of U.S. patent application Ser. No. 09/704,150, filed Nov. 1, 2000, and entitled "System and Method for Monitoring and Controlling Residential Devices"; U.S. patent application Ser. No. 09/271,517; filed Mar. 18, 1999, and entitled, "System For Monitoring Conditions in a Residential Living Community;" Ser. No. 09/439,059, filed Nov. 12, 1999, and entitled, "System and Method for Monitoring and Controlling Remote Devices," and Ser. No. 09/102,178; filed Jun. 22, 1998, entitled, "Multi-Function General Purpose Transceiver;" Ser. No. 09/172,554; filed Oct. 14, 1998, entitled, "System for Monitoring the Light Level Around an ATM;" Ser. No. 09/412,895; filed Oct. 5, 1999, entitled, "System and Method for Monitoring the Light Level Around an ATM." Each of the identified U.S. patent applications is incorporated herein by reference in its entirety. This application also claims the benefit of U.S. provisional application Ser. No. 60/224,043, filed Aug. 9, 2000, and entitled "SOS OEA Packet Message Protocol (RF)", the contents of which are also hereby incorporated by reference in its entirety.

FIELD OF THE INVENTION

The present invention generally relates to remotely operated systems, and more particularly to a computerized system for monitoring, controlling and reporting on remote systems by transferring information via radio frequency (RF) signals by a message protocol system.

BACKGROUND

There are a variety of systems for monitoring and controlling manufacturing processes, inventory systems, emergency control systems, etc. Most automatic systems use remote sensors and controllers to monitor and automatically respond to system parameters to reach desired results. A number of control systems utilize computers to process sensor outputs, to model system responses, and to control actuators that implement process corrections within the system. Both the electric power generation and metallurgical processing industries successfully control production processes by implementing computer control systems in individual plants.

For example, many environmental and safety systems require real-time monitoring. Heating, ventilation, and air-conditioning systems (HVAC), fire reporting and suppression systems, alarm systems, and access control systems utilize real-time monitoring and often require immediate feedback and control.

A problem with expanding the use of control system technology is the cost of the sensor/actuator infrastructure required to monitor and control such systems. The typical approach to implementing control system technology includes installing a local network of hard-wired sensor(s)/actuator(s) and a local controller. There are expenses associated with developing and installing the appropriate sensor(s)/actuator(s) and connecting functional sensor(s)/actuator(s) with the local controller. Another prohibitive cost of control systems is the installation and operational expenses associated with the local controller.

FIG. 1 sets forth a block diagram illustrating certain fundamental components of a prior art control system 100. More particularly, a prior art control system 100 includes a plurality of sensor/actuators 111, 112, 113, 114, 115, 116 and 117 electrically and physically coupled to a local controller 110. In a manner well known in the art of control systems, local controller 110 provides power, formats and applies data signals from each of the sensors to predetermined process control functions, and returns control signals as appropriate to the system actuators. Often, prior art control systems are further integrated via the public switched telephone network (PSTN) 120 to a central controller 130. Central controller 130 can also serve as a technician monitoring station and/or forward alarm conditions via PSTN 120 to appropriate officials.

Prior art control systems similar to that of FIG. 1 require the development and installation of an application-specific local system controller. In addition, each local system requires the direct coupling of electrical conductors to each sensor and actuator to the local system controller. Such prior art control systems are typically augmented with a central controller 130 that may be networked to the local controller 110 via PSTN 120. As a result, prior art control systems often are susceptible to a single point of failure if local controller 110 goes out of service. Also, appropriately wiring an existing industrial plant can be a dangerous and expensive proposition.

Accordingly, there is a need for monitoring and control systems that overcome the shortcomings of the prior art.

SUMMARY OF THE INVENTION

The present invention is directed to a system and method of monitoring and controlling remote devices. More specifically, the present system is directed to a computerized system for monitoring and controlling remote devices by transmitting data between the remote systems and a gateway interface via a packet message protocol system.

The system comprises one or more remote sensors to be read and possibly one or more actuators to be remotely controlled. The remote sensor(s)/actuator(s) then interface with uniquely identified remote transceivers that transmit and/or receive data. If necessary in individual applications, signal repeaters may relay information between the transceiver(s) and the gateway interface. Communication links between the remote transceivers and the gateway interface are preferably wireless but may also be implemented via a mixture of wireless and wired communication links.

To successfully communicate between the transceiver(s) and the gateway interface, the present invention receives a plurality of RF signal transmissions containing a packet protocol via RF signals that includes sender and receiver identifiers, a description of the packet itself, a message number, any commands, the data, and an error detector. In addition, the packet protocol can be easily integrated with alternate data communication protocols for use with systems other than the Internet.

Also, the present invention can be easily integrated into an existing control system via networked wireless transceivers. Distinct control signals from the pre-existing system are easily mapped into the packet protocol. This allows the present invention to be integrated into a pre-existing control system easily and inexpensively.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 7 is a table illustrating the message protocol of the present invention;

FIG. 8 is a table illustrating various "to" addresses; and

FIG. 9 illustrates three sample messages using the message protocol of the present invention.

DETAILED DESCRIPTION OF THE PREFERRED EMBODIMENT

Figure 1:
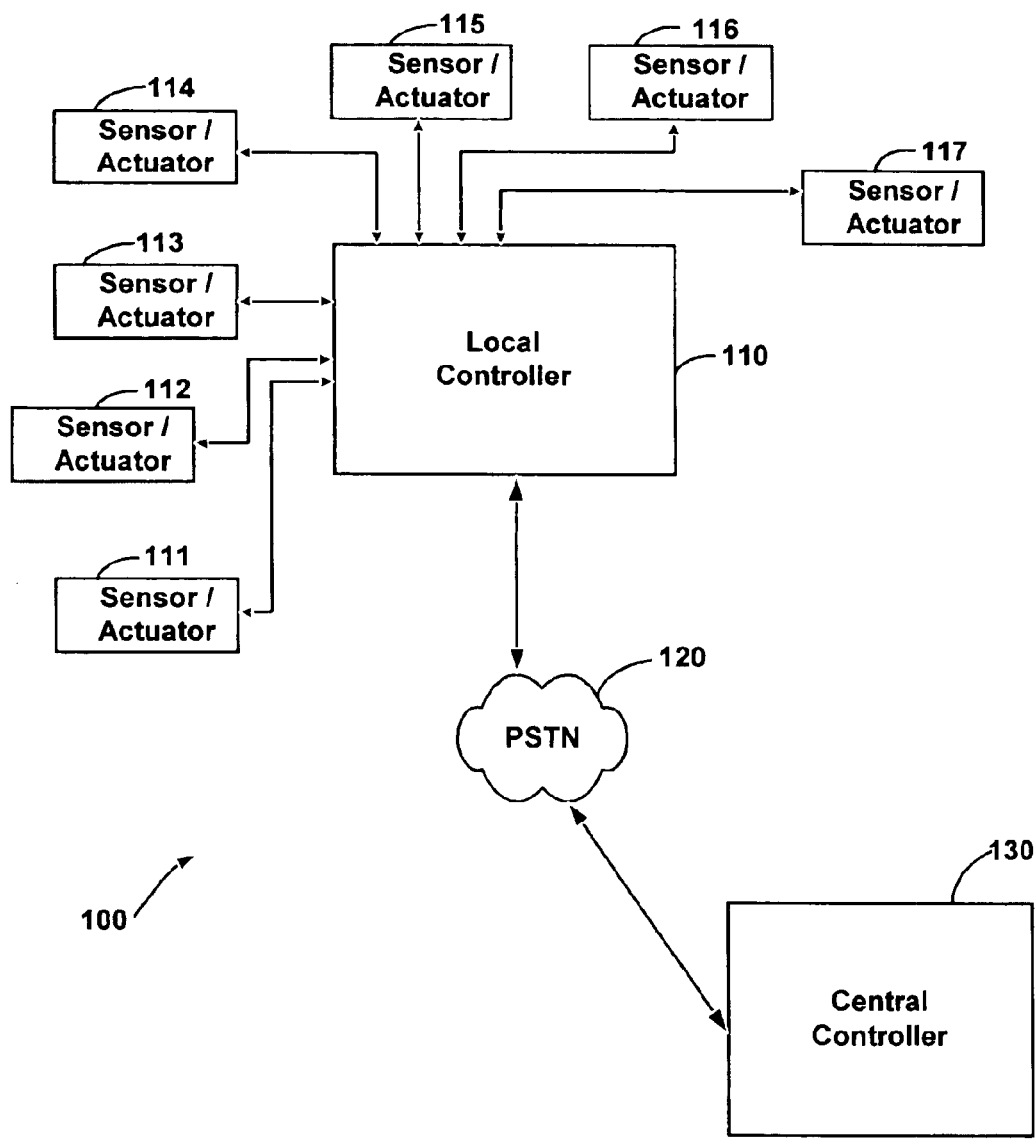
FIG. 1 is a block diagram of a prior art control system.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2:
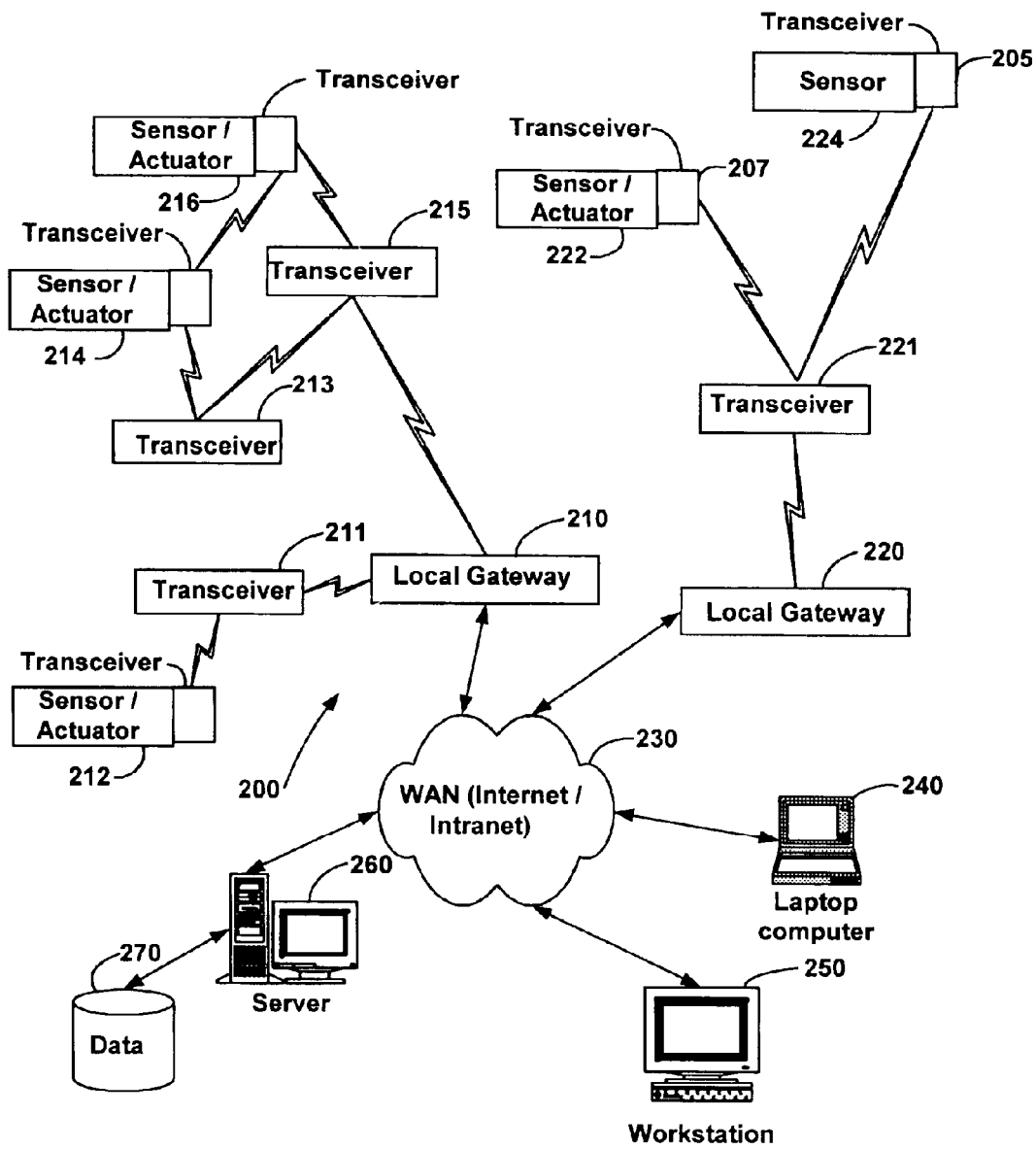
FIG. 2 is a block diagram illustrating a monitoring/control system of the present invention.

FIG. 2 sets forth a block diagram that illustrates an embodiment of a control system in accordance with the present invention. The control system 200 may consist of one or more transceivers. An exemplary transceiver 205 can be integrated with a sensor 224 to form a first combination. A second transceiver 207 can be integrated with an actuator 222 to form a second combination. The transceivers 205, 207 may preferably be wireless RF transceivers that are relatively small in size and transmit a relatively low power RF signal. As a result, in some applications, the transmission range of a given transceiver 205, 207 may be relatively limited. As will be appreciated from the description that follows, this relatively limited transmission range of the transceivers 205, 207 can be a desirable characteristic of the control system 200. Although the transceivers 205, 207 are depicted without user interfaces such as a keypad (not shown), the transceivers 205, 207 may be configured with user selectable buttons or an alphanumeric keypad (not shown). Often, the transceivers 205, 207 can be electrically interfaced with a sensor/actuator 222 such as a smoke detector, a thermostat, a security system, etc., where external buttons are not needed.

It is significant to note that one or more specific types of RF transceivers may be used with the present invention. For example, one RF transceiver that may be used is the TR1000, manufactured by RF Monolithics, Inc. The TR1000 hybrid transceiver is well suited for short range, wireless data applications where robust operation, small size, low power consumption, and low-cost are desired. All critical RF functions may be performed within a single hybrid semi-conductor chip, simplifying circuit design and accelerating the design-in process. The receiver section of the TR1000 is sensitive and stable. A wide dynamic range log detector, in combination with digital automatic gain control (AGC) provide robust performance in the presence of channel noise or interference. Two stages of surface acoustic wave (SAW) filtering provide excellent receiver out-of-band rejection. The transmitter includes provisions for both on-off keyed (OOK) and amplitude-shift key (ASK) modulation. The transmitter employs SAW filtering to suppress output harmonics, for compliance with FCC and other regulations.

Additional details of the TR1000 transceiver need not be described herein, because the present invention is not limited by the particular choice of transceiver. Indeed, numerous RF transceivers may be implemented in accordance with the teachings of the present invention. Such other transceivers may include other 900 MHz transceivers, as well as transceivers at other frequencies. In addition, infrared, ultrasonic, and other types of wireless transceivers may be employed, consistent with the broad scope of the present invention. Further details of the TR1000 transceiver may be obtained through data sheets, application notes, design guides (e.g., the "ASH Transceiver Designers Guide"), and other publications known by those skilled in the art.

The control system 200 also can include a plurality of stand-alone transceivers 211, 213, 215 and 221. Each of the stand-alone transceivers 211, 213, 215 and 221 and each of the integrated transceiver 212, 214, 216, 222, and 224 can receive an incoming RF transmission and transmit an outgoing signal. This outgoing signal may be another low power RF transmission signal, a higher power RF transmission signal, or together with alternative embodiments may be transmitted over a conductive wire, a fiber optic cable, or other transmission media. It will be appreciated by those skilled in the art that the integrated transceivers 212, 214, 216, 222 and 224 can be replaced by RF transmitters (not shown) for client specific applications that require continuous data collection only.

The local gateways 210 and 220 can receive remote data transmissions from one or more of the stand-alone transceivers 211, 213, 215, and 221 or one or more of the integrated transceivers 212, 214, 216, 222, and 224. The local gateways 210 and 220 analyze the transmissions received, convert the transmissions into TCP/IP format, and further communicate the remote data signal transmissions via the WAN 230. In this regard, the local gateways 210 and 220 may communicate information, service requests, control signals, etc. to the remote integrated transceivers 212, 214, 216, 222, and 224, from the server 260, the laptop computer 240, and/or the workstation 250 across the WAN 230. The server 260 can be further networked with the database server 270 to record client specific data. Further information regarding the integration of the invention into the WAN can be found in the commonly assigned U.S. utility patent application entitled, "System and Method for Monitoring and Controlling Residential Devices," issued Ser. No. 09/704,150.

It will be appreciated by those skilled in the art that if an integrated transceiver (either of 212, 214, 216, 222, and 224) is located sufficiently close to one of the local gateways 210 or 220 such that the integrated transceiver's outgoing signal can be received by a gateway, the outgoing signal need not be processed and repeated through one of the stand-alone transceivers 211, 213, 215, or 221.

It will be further appreciated that a monitoring system constructed in accordance with the teachings of the present invention may be used in a variety of environments. In accordance with a preferred embodiment, a monitoring system such as that illustrated in FIG. 2 may be employed to monitor and record utility usage by residential and industrial customers, to transfer vehicle diagnostics from an automobile via a RF transceiver integrated with the vehicle diagnostics bus to a local transceiver that further transmits the vehicle information through a local gateway onto a WAN, to monitor and control an irrigation system, to automate a parking facility, etc. Further information regarding these individual applications can be found in the commonly assigned U. S. utility patent application entitled, "System and Method for Monitoring and Controlling Residential Devices," issued Ser. No. 09/704,150.

The integrated transceivers 212, 214, 215, 222, and 224 may have substantially identical construction (particularly with regard to their internal electronics), which provides a cost-effective implementation at the system level. Alternatively, the transceivers (integrated or stand-alone) can differ as known to one of ordinary skill in the art as necessitated by individual design constraints. Furthermore, a plurality of stand-alone transceivers 211, 213, 215, and 221, which may be identical, may be disposed in such a way that adequate RF coverage is provided. Preferably, the stand-alone transceivers 211, 213, 215, and 221 may be dispersed sufficient that only one stand-alone transceiver will pick up a transmission from a given integrated transceiver 212, 214, 216, 222, and 224 (due in part to the low power transmission typically emitted by each transmitter).

However, in certain instances, two, or even more, stand-alone transceivers may pick up a single transmission. Thus, the local gateways 210 and 220 may receive multiple versions of the same data transmission from an integrated transceiver but from different stand-alone transceivers. The local gateways 210 and 220 may utilize this information to triangulate or otherwise more particularly assess the location from which the common data transmission is originating. Due to the transmitting device identifier incorporated within the preferred protocol in the transmitted signal, duplicative transmissions (e.g., transmissions duplicated to more than one gateway or to the same gateway) may be ignored or otherwise appropriately handled.

The advantage of integrating a transceiver, as opposed to a one-way transmitter, with the sensor is the transceiver's ability to receive incoming control signals and to transmit data signals upon demand. Significantly, the local gateways 210 and 220 may communicate with all system transceivers. Since the local gateways 210 and 220 are permanently integrated with the WAN 230, the server 260 communicatively coupled with the WAN 230 can host application specific software. Further, the data monitoring and control devices of the present invention are movable as necessary given that they remain within signal range of a stand-alone transceiver 211, 213, 215, or 221 that subsequently is within signal range of a local gateway 210, 220 interconnected through one or more networks to server 260. As such, small application specific transmitters compatible with control system 200 can be worn or carried about one's person. It will be appreciated that a person so equipped may be in communication with any device communicatively coupled with the WAN 230.

In one embodiment, the server 260 collects, formats, and stores client specific data from each of the integrated transceivers 212, 214, 216, 222, and 224 for later retrieval or access from the workstation 250 or the laptop 240. In this regard, the workstation 250 or the laptop 240 can be used to access the stored information through a Web browser in a manner that is well known in the art. In another embodiment, the server 260 may perform the additional functions of hosting application specific control system functions and replacing the local controller by generating required control signals for appropriate distribution via the WAN 230 and the local gateways 210, 220 to the system actuators. In a third embodiment, clients may elect for proprietary reasons to host any control applications on their own WAN connected workstation. In this regard, the database 270 and the server 260 may act solely as a data collection and reporting device with the client workstation 250 generating control signals for the system. Further information can be found in the commonly assigned U.S. utility patent application entitled, "System and Method for Monitoring and Controlling Residential Devices," issued Ser. No. 09/704,150.

Figure 3:
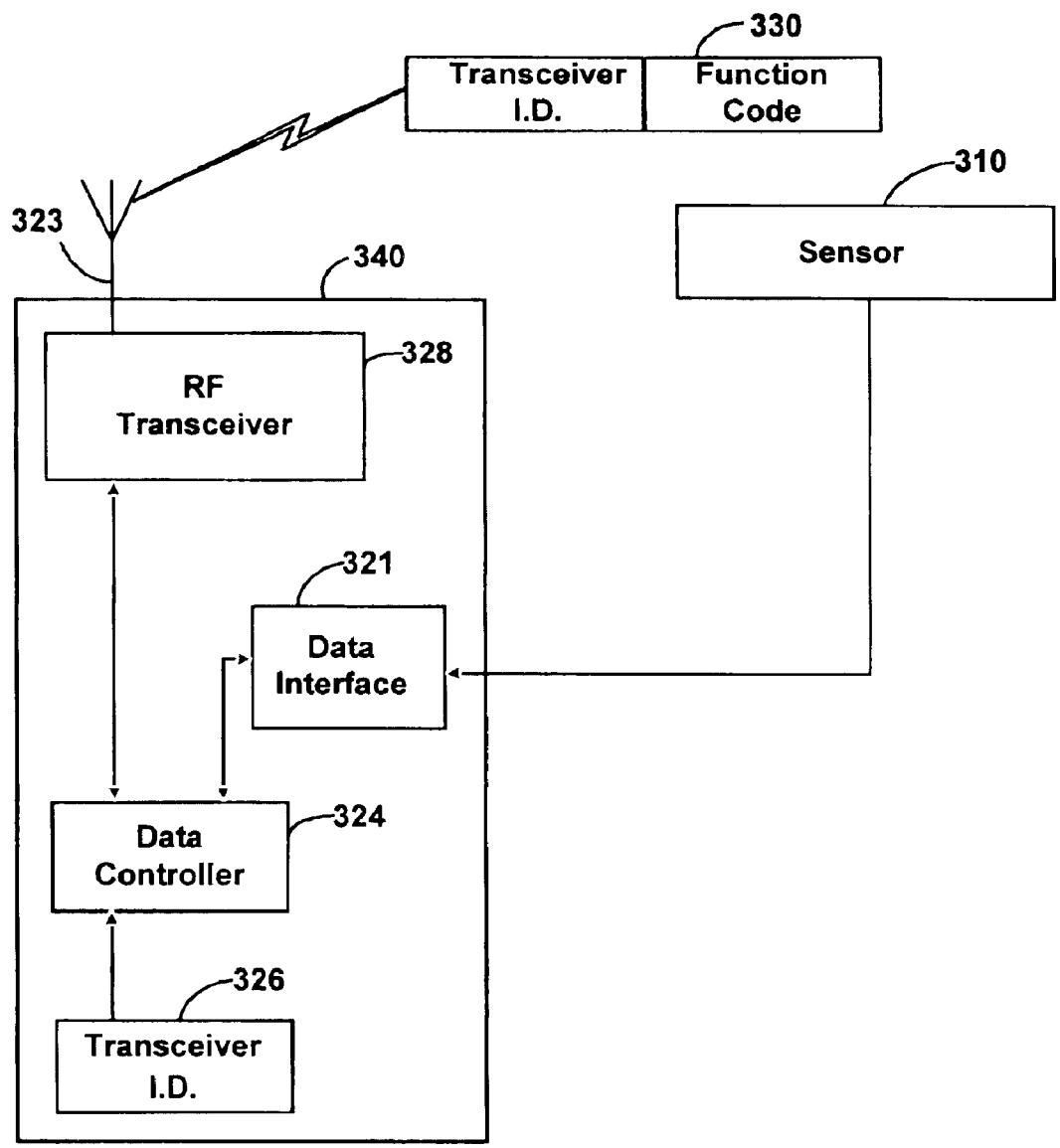
FIG. 3 is a block diagram illustrating a transceiver in accordance with the present invention integrated with a sensor.

Reference is now made to FIG. 3, which is a block diagram illustrating certain functional blocks of a transceiver 340 that may be integrated with sensor 310. For example, sensor 310 in its simplest form could be a two-state device such as a smoke alarm. Alternatively, the sensor 310 may output a continuous range of values to the data interface 321 such as a thermometer. If the signal output from the sensor 310 is an analog signal, the data interface 321 may include an analog-to-digital converter (not shown) to convert signals output to the transceiver 340. Alternatively, a digital interface (communicating digital signals) may exist between the data interface 321 and each sensor 310.

In FIG. 3, the sensor 310 may be communicatively coupled with the RF transceiver 340. The RF transceiver 340 may comprise a RF transceiver controller 328, a data interface 321, a data controller 324, a transceiver identificatier 326, and an antenna 328. As is shown in FIG. 3, a data signal forwarded from the sensor 310 may be received at an input port of the data interface 321. The data interface 321 may be configured to receive the data signal. In those situations where the data interface has received an analog data signal, the data interface 321 may be configured to convert the analog signal into a digital signal before forwarding a digital representation of the data signal to the data controller 324.

In accordance with a preferred embodiment, each transceiver 324 may be configured with a unique transceiver identification 326 that uniquely identifies the RF transceiver 340. The transceiver identification 326 may be programmable, and implemented in the form of, for example, an EPROM. Alternatively, the transceiver identification 326 may be set/configured through a series of dual inline package (DIP) switches. Additional implementations of the transceiver identification 326, whereby the number may be set/configured as desired, may be implemented consistent with the broad concepts of the present invention.

The unique transceiver identification 326 coupled with a function code for a sensor "on" condition is formatted by data controller 324 for transformation into the RF signal 330 by RF transmitter 328 and transmission via antenna 323.

While the unique transceiver address can be varied within the scope of the invention, it preferably can be a six-byte address. The length of the address can be varied as necessary given individual design constraints. In this way, data packet 330 communicated from transceiver 340 will readily distinguish from similar signals generated by other transceivers in the system.

Of course, additional and/or alternative configurations may also be provided by a similarly configured transceiver. For example, a similar configuration may be provided for a transceiver that is integrated into, for example, a carbon monoxide detector, a door position sensor, etc. Alternatively, system parameters that vary across a range of values may be transmitted by transceiver 340 as long as data interface 321 and data controller 324 are configured to apply a specific code that is consistent with the input from sensor 310. As long as the code was understood by the server 260 or workstation 250, the target parameter could be monitored with the present invention.

Figure 4:
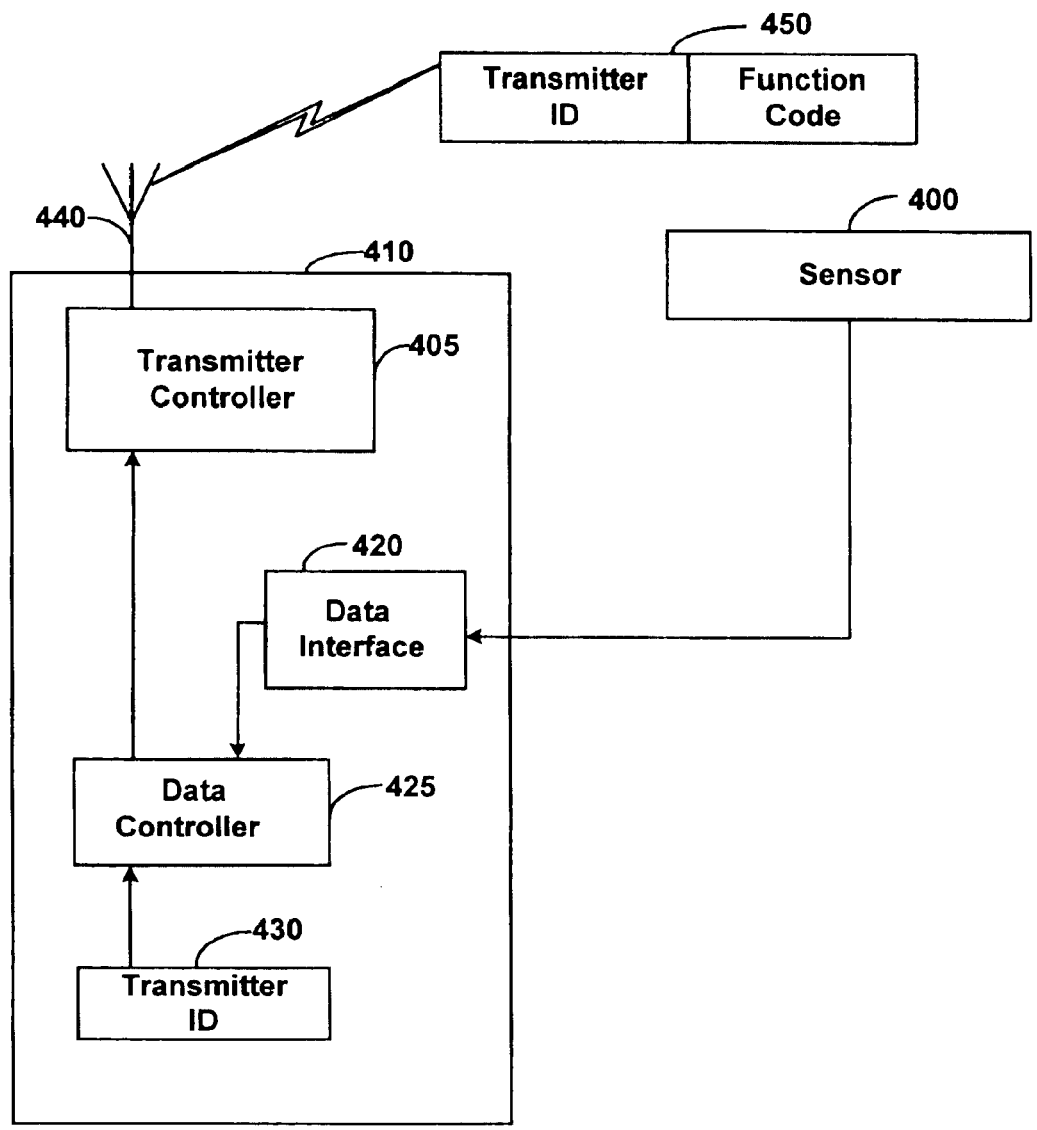
FIG. 4 is a block diagram illustrating a transmitter in accordance with the present invention integrated with a sensor.

Reference is now made to FIG. 4. Alternatively, the sensor 400 may be communicatively coupled with the RF transmitter 410. The RF transmitter 410 may comprise a transmitter controller 415, a data interface 420, a data controller 425, a transmitter identification 430, and an antenna 440. The data signal forwarded from the sensor 400 may be received at an input port of the data interface 420. The data interface 420 may be configured to receive the data signal. In those situations where the data interface has received an analog data signal, the data interface 420 may be configured to convert the analog signal into a digital signal before forwarding a digital representation of the data signal to the data controller 425.

Each transmitter/transceiver may be configured with a unique transmitter identification 430 that uniquely identifies the RF transmitter 410. The transmitter identification number 430a may be programmable, and implemented in the form of, for example, an EPROM. Alternatively, the transmitter identification 430 may be set/configured through a series of dual inline package (DIP) switches. Additional implementations of the transmitter identification 430, whereby the identification may be set/configured as desired, may be implemented consistent with the broad concepts of the present invention.

The data controller 425 may be configured to receive both a data signal from the data interface 420 and the transmitter identification 430. The data controller 425 may be configured to format (e.g., concatenate) both data portions into a composite information signal. The composite information signal may be forwarded to the transmitter controller 415 which then transmits the encoded RF signal from the sensor 400 via a packet message protocol system. It will be appreciated that the transmitter controller 415 may convert information from digital electronic form into a format, frequency, and voltage level suitable for transmission from antenna 440. The transmitter identification 430 is set for a given transmitter 410. When received by the application server 260 (FIG. 2), the transmitter identification 430 may be used to access a look-up table that identifies, for example, the location, the system, and the particular parameter assigned to that particular transmitter. Additional information about the related system may also be provided within the lookup table, with particular functional codes associated with a corresponding condition or parameter, such as but not limited to, an appliance operating cycle, a power on/off status, a temperature, a position, and/or any other information that may be deemed appropriate or useful under the circumstances or implementation of the particular system.

Figure 5:
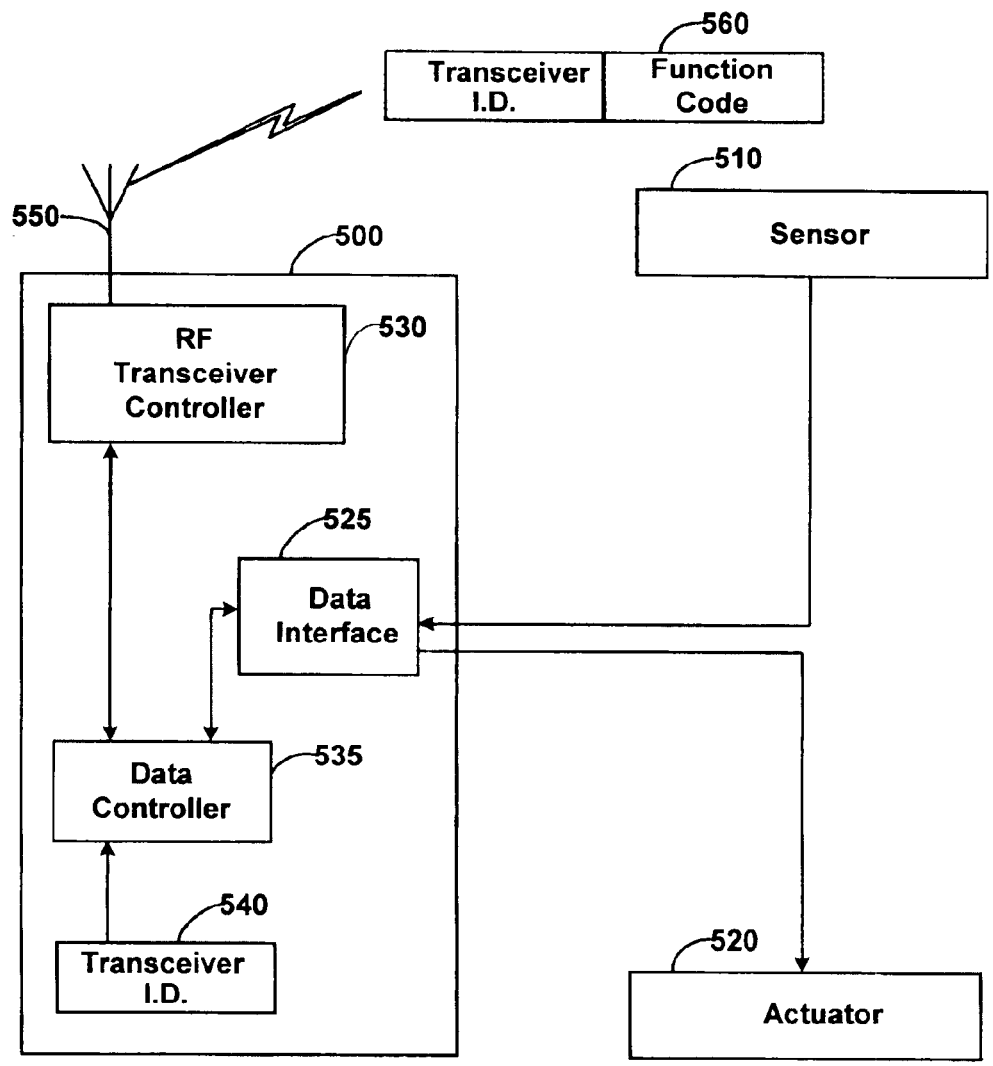
FIG. 5 is a block diagram illustrating a transceiver in accordance with the present invention integrated with a sensor and an actuator.

FIG. 5 sets forth a block diagram of the transceiver 500 that is integrated with a sensor 510 and an actuator 520. Here, the data interface 525 is shown with a single input from the sensor 510. It is easy to envision a system that may include multiple sensor inputs. The RF transceiver 500 may comprise a transceiver controller 530, a data interface 525, a data controller 535, a transceiver identification 540, and an antenna 550. The data signal forwarded from the sensor 510 may be received at an input/output port of the data interface 525. The data interface 525 may be configured to receive the data signal and transmit a command signal. In those situations where the data interface 525 has received an analog data signal, the data interface 525 may be configured to convert the analog signal into a digital signal before forwarding a digital representation of the data signal to the data controller 525. Similarly, when the data controller 535 forwards a digital representation of a command signal, the data interface 525 may be configured to translate the digital command signal into an analog voltage suitable to drive the actuator 520.

In accordance with a preferred embodiment, each RF transceiver 500 may be configured with a unique transceiver identification 540, that uniquely identifies the RF transceiver 500 The transceiver identification 540 may be set/configured as described above within the broad concepts of the present invention.

The data controller 535 may be configured to receive both a data signal from the data interface 525 and the transceiver identification number 540. The data controller 535 may also receive one or more data signals from other RF communication devices. As previously described, the data controller 535 may be configured to format (e.g., concatenate) both data signal portions originating at the RF transceiver 500 into a composite information signal which may also include data information from other closely located RF communication devices. The composite information signal may be forwarded to a transceiver controller 530, which may be configured to transmit the encoded RF data signals via the packet messaging system. It will be appreciated that the transceiver controller 530 may convert information from digital electronic form into a format, frequency, and voltage level suitable for transmission from the antenna 550.

By way of example, a common home heating and cooling system might be integrated with the present invention. The home heating system may include multiple data interface inputs from multiple sensors. A home thermostat control connected with the home heating system could be integrated with a sensor that reports the position of a manually adjusted temperature control (i.e., temperature set value) and a sensor integrated with a thermister to report an ambient temperature. The condition of related parameters can be sent to the data interface 525 as well as including the condition of the system on/off switch, the climate control mode selected (i e., heat, fan, or AC), etc. In addition, depending upon the specific implementation, other system parameters may be provided to data interface 525 as well.

The addition of the actuator 520 to the integrated transceiver permits the data interface 525 to apply signals to the manual temperature control for the temperature set point, the climate control mode switch, and the system on/off switch. In this way, a remote workstation 250 or a laptop 240 with WAN access (see FIG. 2) could control a home heating system from a remote location.

Again, each of these various input sources is routed to the data interface 525, which provides the information to the data controller 535. The data controller 535 may utilize a look up table to access unique function codes that are communicated in the data packet 560, along with a transceiver identification code 540, to the local gateway and further onto the WAN. In general, the operation of RF transceiver 500 will be similar to that described above.

It will be appreciated by persons skilled in the art that the various RF communication devices illustrated and described may be configured with a number of optional power supply configurations. For example, a personal mobile transceiver may be powered by a replaceable battery. Similarly, a stand-alone RF transceiver/repeater may be powered by a replaceable battery that may be supplemented and or periodically charged via a solar panel. These power supply circuits, therefore, may differ from RF communication device to RF communication device depending upon the remote system monitored, the related actuators to be controlled, the environment, and the quality of service level required. Those skilled in the art will appreciate and understand how to meet the power requirements of the various RF communication devices. As a result, it is not necessary to further describe a power supply suitable for each RF communication device and each application in order to appreciate the concepts and teachings of the present invention.

Figure 6:
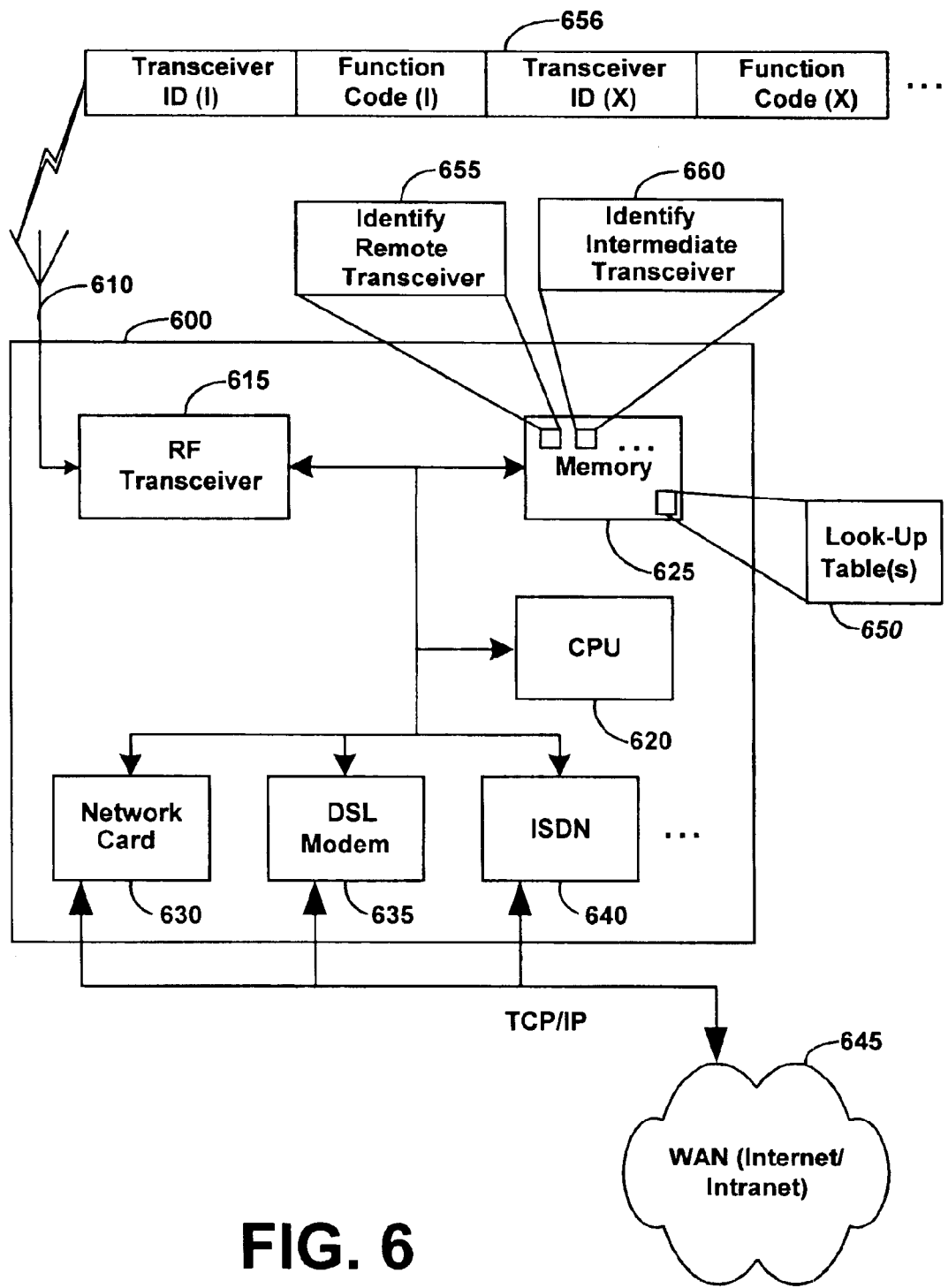
FIG. 6 is a block diagram illustrating a local gateway in accordance with the present invention.

Having illustrated and described the operation of the various combinations of RF communication devices with the various sensors 114 and sensor/actuators 112 consistent with the present invention, reference is now made to FIG. 6, which is a block diagram further illustrating a local gateway 600. A local gateway 600 may comprise an antenna 610, an RF transceiver 615, a central processing unit (CPU) 620, a memory 624, a network card 630, a digital subscriber line (DSL) modem 635, an integrated services digital network (ISDN) interface card 640, as well as other components not illustrated in FIG. 6, capable of enabling a terminal control protocol/Internet protocol (TCP/IP) connection to the WAN 130.

The RF transceiver 615 may be configured to receive incoming RF signal transmissions via the antenna 610. Each of the incoming RF signal transmissions are consistently formatted in the convention previously described. The local gateway 600 may be configured such that the memory 625 includes a look-up table 650 that may assist in identifying the various remote and intermediate RF communication devices used in generating and transmitting the received data transmission as illustrated in memory sectors 650 and 660 herein labeled, "Identify Remote Transceiver" and "Identify Intermediate Transceiver," respectively. Programmed or recognized codes within the memory 625 may also be provided and configured for controlling the operation of a CPU 620 to carry out the various functions that are orchestrated and/or controlled by the local gateway 600. For example, the memory 625 may include program code for controlling the operation of the CPU 625 to evaluate an incoming data packet to determine what action needs to be taken. In this regard, one or more look-up tables 650 may also be stored within the memory 625 to assist in this process. Furthermore, the memory 625 may be configured with program code configured to identify a remote RF transceiver 655 or identify an intermediate RF transceiver 660. Function codes, RF transmitter and or RF transceiver identification numbers may all be stored with associated information within the look-up tables 650.

Thus, one look-up table 650 may be provided to associate transceiver identifications with a particular user. Another look-up table 650 may be used to associate function codes with the interpretation thereof. For example, a unique code may be associated by a look-up table 650 to identify functions such as test, temperature, smoke alarm active, security system breach, etc. In connection with the lookup table(s) 650, the memory 625 may also include a plurality of code segments that are executed by the CPU 620, which may in large part control operation of the gateway 600. For example, a first data packet segment 665 may be provided to access a first lookup table to determine the identity of the RF transceiver 625, which transmitted the received message. A second code segment may be provided to access a second lookup table to determine the proximate location of the message generating RF transceiver 600, by identifying the RF transceiver 600 that relayed the message. A third code segment may be provided to identify the content of the message transmitted. Namely, is it a fire alarm, a security alarm, an emergency request by a person, a temperature control setting, etc. Consistent with the invention, additional, fewer, or different code segments may be provided to carry out different functional operations and data signal transfers of the present invention.

The local gateway 600 may also include one or more mechanisms to facilitate network based communication with remote computing devices. For example, the gateway 600 may include a network card 630, which may allow the gateway 600 to communicate across a local area network to a network server, which in turn may contain a backup gateway 110 to the WAN 645. Alternatively, the local gateway 600 may contain a DSL modem 635, which may be configured to provide a link to a remote computing system, by way of the PSTN. In yet another alternative, the local gateway 600 may include an ISDN card 640 configured to communicate via an ISDN connection with a remote system. Other communication interfaces may be provided as well to serve as primary and or backup links to the WAN 645 or to local area networks that might serve to permit local monitoring of local gateway 600 health and data packet control.

For each of the remote devices to communicate, there needs to be a standard so that each device can understand the message. FIG. 7 sets forth a format of the data packet protocol of the present invention. All messages transmitted within the system consist of a "to" address 700, a "from" address 710, a packet number 720, a number of packets in a transmission 730, a packet length 740, a message number 750, a command number 760, any data 770, and a check sum error detector (CKH 780 and CKL 790).

The "to" address 700 indicates the intended recipient of the packet. This address can be scalable from one to six bytes based upon the size and complexity of the system. By way of example, the "to" address 700 can indicate a general message to all transceivers, to only the stand-alone transceivers, or to an individual integrated transceiver. In a six byte "to" address, the first byte indicates the transceiver type—to all transceivers, to some transceivers, or a specific transceiver. The second byte can be the identification base, and bytes three through six can be used for the unique transceiver address (either stand-alone or integrated). The "to" address 700 is scalable from one byte to six bytes depending upon the intended recipient(s). Attention is drawn to FIG. 8 and its forthcoming discussion for examples.

The "from" address 710 is the six-byte unique transceiver address of the transceiver originating the transmission. The "from" address 710 can be the address of the controller when the controller requests data, or this can be the address of the integrated transceiver when the integrated transceiver sends a response to a request for information to the controller.

The packet number 720, the packet maximum 730, and the packet length 740 can be used to concatenate messages that are greater than 128 bytes. The packet maximum 730 indicates the number of packets in the message. The packet number 720 may be used to indicate a packet sequence number for a multiple-packet message.

The message number 750 is originally assigned by the controller. Messages originating from the controller are assigned an even number. Responses to the controller are the original message number plus one, rendering the responding message number odd. The controller then increments the message number 750 by two for each new originating message. This allows the controller to coordinate the incoming responses to the appropriate command message.

The next section is the command byte 760 that requests data from the receiving device as necessary. There can be two types of commands: device specific and not device specific. Device specific commands control a specific device such as a data request or a change in current actuator settings. A number of commands are not device specific. Such commands are for example, but not limited to, a ping, an acknowledge, a non-acknowledgement, downstream repeat, upstream repeat, read status, emergency message, a request for general data, among others. General data may include a software version number, the number of power failures, the number of resets, etc.

The data 770 section may contain data as requested by a specific command. The requested data can be any value. By way of example, test data can preferably be encoded in ASCII (American Standard Code for Information Interchange) or other known encoding systems as is well known in the art. The data section of a single packet is scalable up to 109 bytes. When the requested data exceeds 109 bytes, the integrated transceiver divides the data into appropriate number of sections and concatenates the series of packets for one message using the packet identifiers as discussed above.

The checksum section 780, 790 is used to detect errors in the transmissions. In one embodiment, any error can be detected via cyclic redundancy check sum methodology. This methodology divides the message as a large binary number by the generating polynomial (in this case, CRC-16). The remainder of this division is then sent with the message as the checksum. The receiver then calculates a checksum using the same methodology and compares the two checksums. If the checksums do not match, the packet or message will be ignored. While this error detection methodology is preferred, one of ordinary skill in the art can substitute other error detection systems as is well known in the art.

In an embodiment of this invention, this system can be implemented via an RF link at a basic rate of 4,800 bits per second (bps) with a data rate of 2400 bps. All the data can be encoded in the Manchester format such that a high to low transition at the bit center point represents a logic zero and a low to high transition represents a logic one. As would be obvious to one of ordinary skill in the art, other RF formats can be used depending upon individual design constraints. By way of example, a quadature phase shift encoding method could be used, enabling the control system to communicate via hexadecimal instead of binary.

While the message indicates specific byte length for each section, only the order of the specific information within the message is constant. The byte position number in individual transmissions can vary because of the scalability of the "to" address, the command byte, and the scalability of the data.

The message further includes a preface and a postscript (not shown). The preface and postscripts are not part of the message body but rather serve to synchronize the control system and to frame each packet of the message. The packet begins with the preface and ends with a postscript. The preface can be a series of twenty-four logic ones followed by two bit times of high voltage with no transition. The first byte of the packet can then follow immediately. The postscript will be a transition of the transmit data line from a high voltage to a low voltage, if necessary. It is less desirable to not leave the transmit data line high after the message is sent. It would be obvious to one of ordinary skill in the art to modify the preface and the postscript as necessary for individual design constraints.

FIG. 8 sets forth one embodiment of the "to" address byte assignment. It would be obvious to one of ordinary skill in the art that modifications to this "to" address can be made within the scope of this invention based upon individual design constraints. In this individual example, the "to" address consists of six bytes. The first byte (Byte 1) can indicate the device type. The second byte (Byte 2) can indicate the manufacturer or the owner. The third byte (Byte 3) can be a further indication of the manufacturer or owner. The fourth byte (Byte 4) either indicates that the message is for all devices or that the message is for a particular device. If the message is for all devices, the fourth by will be a particular code. If the message is for a particular device, the fourth, fifth, and sixth bytes (Byte 5 and Byte 6) are the unique identifier for that particular device.

Having described the general message structure of the present invention, reference is directed to FIG. 9, which illustrates three sample messages. The first message 910 illustrates the broadcast of an emergency message "FF" from a central server with an address "0012345678" to a integrated transceiver with an address of "FF."

The second message 920 illustrates how the first message might be sent to a stand-7alone transceiver. In this manner, emergency message "FF" from a central server with address "00123456578" is first sent to stand-alone transceiver "FO." The second message, further contains additional command data "A000123456" that may be used by the system to identify further transceivers to send the signal through on the way to the destination device.

The third message 930 illustrated in FIG. 9 illustrates how the message protocol of the present invention may be used to "ping" a remote transceiver in order to determine transceiver health. In this manner, source unit "E112345678" originates a ping request by sending command "08" to a transceiver identified as "A012345678." The response to the ping request can be as simple as reversing the "to address" and the "from address" of the command such that a healthy receiver will send a ping message back to the originating device. A system in accordance with the present invention may be configured to expect a return ping within a specific time period. Operators of the present invention could use the delay between the ping request and the ping response to model system loads and to determine if specific system parameters might be adequately monitored and controlled with the expected feedback transmission delay of the system.

Returning to FIG. 2, the local gateway 210 acts as the local communications master in a system. With the exception of emergency messages, the local gateway 210 usually initiates communications with any remote transceivers (either stand-alone 211, 213, 215, 221 or integrated 212, 214, 216, 224). The remote transceivers then respond based upon the command received in the message. In general, the local gateway 210 expects a response to all messages sent to any of the remote transceivers 211, 212, 213, 214, 215, 216, 221, and 225.

To acknowledge a message, any of the remote transceivers 211, 212, 213, 214, 215, 216, 221, 224 can send one of two messages: a tacit, positive acknowledgement or a negative acknowledgement. The positive acknowledgement may have two forms. When the message is between the local gateway 210 or a stand-alone transceiver 211, 213, 215, 221 and another stand-alone transceiver 211, 213, 215, 221, the acknowledgement is to re-send the original message with no changes. The second form is for a message sent from the local gateway 210 stand-alone transceiver 211, 213, 215, 221 to a integrated transceiver 212, 214, 216, 224. In this case, the positive acknowledgement is a message containing the requested data.

Emergency messages, preferably the only messages initiated by the integrated transceiver 212, 214, 216, 224. To accommodate receiving any emergency messages, the local gateway 210 may dedicate one-half of every ten-second period to receive emergency messages. During these time periods, the local gateway 210 may not transmit messages other than acknowledgements to any emergency messages. The integrated transceiver 212, 214, 216, 224 may detect the period of silence, and in response, may then transmit the emergency message.

There are typically two forms of emergency messages: from personal safety/security transceiver(s) and from permanently installed safety/security transceiver(s). In the first case of the personal transceiver, the emergency message consists of a predetermined "to" address and an odd, random number. In response to this emergency message, the local gateway 210 acknowledges during a silent period. The personal transceiver then repeats the same emergency message. The local gateway 210 then forwards the emergency message on to the WAN 230 in the normal manner.

Upon receipt of the local gateway 210 acknowledgement, the personal transceiver resets itself. If no acknowledgement is received within a predetermined time period, the personal transceiver continues to re-transmit the original emergency message until acknowledged by the local gateway 210 for a predetermined number of re-transmissions.

In the second case, the permanently installed safety/security transceiver (exemplar 212) may send one message to the local gateway 210 during a time out period. The emergency message is transmitted to a predetermined address other than the emergency address for personal transceivers.

It will be appreciated that the foregoing description has illustrated certain fundamental concepts of the invention, but that other additions and/or modifications may be made consistent with the inventive concepts. For example, the one-way transmitters may be adapted to continuously monitor the current status of water, gas and other utility meters. One-way transmitters might further be used to monitor and report actual operational hours on rental equipment or any other apparatus that must be serviced or monitored on an actual run-time schedule. These transmitters are limited as they cannot receive signals from the local gateway such as a status check, a ping request, etc.

The transceivers of the current invention may be adapted to monitor and apply control signals in an unlimited number of applications. By way of example only, two-way transceivers of the current invention can be adapted for use with pay type publicly located telephones, cable television set converter boxes, as well as, for use with a host of residential appliances and devices to enable a remote controllable home automation and security system.

In a geographic area appropriately networked with permanently located stand-alone transceivers consistent with the invention, personal transceivers consistent with the current invention can be used to monitor and control personnel access and egress from specific rooms or portions thereof within a controlled facility. Personal transceivers can further be configured to transfer personal information to public emergency response personnel, to transfer personal billing information to vending machines, or to monitor individuals within an assisted living community.

Transceivers using the packet message protocol consistent with the present invention can be integrated to monitor and control a host of industrial and business applications as well. By way of example only, building automation systems, fire control systems, alarm systems, industrial trash compactors, and building elevators can be monitored and controlled with devices consistent with the present invention. In addition, courier drop boxes, time clock systems, automated teller machines, self-service copy machines, and other self-service devices can be monitored and controlled as appropriate. By way of further example, a number of environment variables that require monitoring can be integrated with the system of the present invention to permit remote monitoring and control. For instance, light levels in the area adjacent to automated teller machines must meet minimum federal standards. Also, the water volume transferred by water treatment plant pumps, smokestack emissions from a coal burning power plant or a coke fueled steel plant oven can be remotely monitored.

The transceivers using the packet message protocol of the present invention may be further integrated with a voice-band transceiver. As a result, when a person presses, for example, the emergency button on his/her transmitter, medical personnel, staff members, or others may respond by communicating via two-way radio with the party in distress. In this regard, each transceiver may be equipped with a microphone and a speaker that would allow a person to communication information such as their present emergency situation, their specific location, etc.

The foregoing description has been presented for purposes of illustration and description. It is not intended to be exhaustive or to limit the inventions to the precise embodiments disclosed. Obvious modifications or variations are possible in light of the above teachings. When the transceiver is permanently integrated into an alarm sensor other stationary device within a system, then the control system server and/or local gateway could be configured to identify the transceiver location by the transceiver identification number alone. It will be appreciated that, in embodiments that do not utilize stand-alone transceivers, the transceivers will be configured to transmit at a higher RF power level in order to effectively communicate with the control system local gateway.

It will be appreciated by those skilled in the art that the information transmitted and received by the wireless transceivers of the present invention may be further integrated with other data transmission protocols for transmission across telecommunications and computer networks. In addition, it should be further appreciated that telecommunications and computer networks can function as a transmission path between the networked wireless transceivers, the local gateways, and the central server.

What is claimed is:

1. A system for communicating commands and sensed data between remote devices, the system comprising:

a plurality of transceivers, each transceiver being in communication with at least one other of the plurality of transceivers, wherein each transceiver has a unique address, wherein the unique address identities an individual transceiver, wherein each transceiver is geographically remote from the other of the plurality of transceivers, wherein each transceiver communicates with each of the other transceivers via preformatted messages;

a controller, connected to one of the plurality of transceivers, the controller being in communications with each of the plurality of transceivers via a controller transceiver, the controller communicating via preformatted messages;

wherein the preformatted messages comprises at least one packet, wherein the packet comprises:

a receiver address comprising a scalable address of the at least one of the intended receiving transceivers;

sender address comprising the unique address of the sending transceiver;

a command indicator comprising a command code;

at least one data value comprising a scalable message; and an error detector comprising a redundancy check error detector; and wherein the controller sends preformatted command messages via the controller transceiver, and the plurality of transceivers send preformatted response messages.

2. The system of claim 1, wherein the plurality of transceivers further comprise at least one integrated transceiver, wherein the integrated transceiver comprises:

one of the plurality of transceivers; and a sensor detecting a condition and outputting a sensed data signal to the transceiver.

3. The system of claim 2, wherein the at least one integrated transceiver receives the preformatted command message requesting sensed data, confirms the receiver address as its own unique address, receives the sensed data signal, formats the sensed data signal into scalable byte segments, determines a number of segments required to contain the sensed data signal, and generates and transmits the preformatted response message comprising at least one packet, wherein the packets are equal to the number of segments.

4. The system of claim 3, wherein a packet further comprises:

a packet length indicator which indicates a total number of bytes in the current packet;

a total packet indicator which indicates the total number of packets in the current message;

a current packet indicator which indicates which packet of the total packets the current packet is; and a message number, wherein the controller generates a sender message in the preformatted command message and the transceiver generates a response message number formed by a mathematical combination of the sender message number and a predetermined offset.

5. The system of claim 4, wherein the packet further comprises a preface and a postscript;

wherein the preface comprises a predetermined sequence comprising a first logic level and a subsequent sequence comprising at least two bytes of a second logic level; and wherein the postscript comprises a low voltage output.

6. The system of claim 5, wherein each transceiver is in wireless communication with at least one other of the plurality of transceivers.

7. The system of claim 6, wherein the wireless communication comprise radio frequency (RF) communication.

8. The system of claim 7, wherein the wireless communication comprise low powered RF communication.

9. The system of claim 8, wherein the preformatted message comprises Manchester encoding.

10. The system of claim 1, wherein the plurality of transceivers further comprise at least one actuated transceiver, wherein the actuated transceiver comprises:

one of the plurality of transceivers;

a sensor detecting a second condition and outputting a sensed data signal to the transceiver; and an actuator controlling a third condition and receiving control signals from the transceiver.

11. The system of claim 10, wherein a packet further comprises:

a packet length indicator which indicates a total number of bytes in the current packet;

a total packet indicator which indicates the total number of packets in the current message;

a current packet indicator which indicates which packet of the total packets the current packet is; and a message number, wherein the controller generates a sender message in the preformatted command message and the transceiver generates a response message number formed by a mathematical combination of the sender message number and a predetermined offset.

12. The system of claim 11, wherein the packet further comprises a preface and a postscript;

wherein the preface comprises a predetermined sequence comprising a first logic level and a subsequent sequence comprising at least two bytes of a second logic level; and wherein the postscript comprises a low voltage output.

13. The system of claim 12, wherein each transceiver wirelessly communicates with at least one other of the plurality of transceivers.

14. The system of claim 13, wherein the wireless communication comprises radio frequency (RF) communication.

15. The system of claim 14, wherein the RF communication comprises a low powered RF communication.

16. The system of claim 15, wherein the preformatted message comprises Manchester encoding.

17. A system for communicating commands and sensed data between remote devices, the system comprising:

a plurality of transceivers, each transceiver being in communication with at least one other of the plurality of transceivers, wherein each transceiver has a unique address, wherein the unique address identifies an individual transceiver, wherein each transceiver is geographically remote from the other of the plurality of transceivers, wherein each transceiver communicates with each of the other transceivers via preformatted messages;

a controller, connected to at least one of the plurality of transceivers, the controller being in communication with each of the plurality of transceivers via the controller transceiver, the controller communicating via preformatted messages, wherein the preformatted messages comprises at least one packet, wherein the packet comprises:

a receiver address comprising a scalable address of the at least one of the intended receiving transceivers;

a sender address comprising the unique address of the sending transceiver;

a command indicator comprising a command code;

at least one data value comprising a scalable message; and an error detector comprising a redundancy check error detector;

wherein the controller sends preformatted command messages via its associated transceiver, and the plurality of transceivers sends preformatted response messages; and wherein at least one of the plurality of transceivers further sends preformatted emergency messages.

18. The system of claim 17, wherein the controller maintains periods of silence by not sending the preformatted command messages during predetermined time periods; and wherein the at least one of the plurality of transceivers detects a period of silence and sends the preformatted emergency message during the period of silence.

19. A system for controlling geographically diverse devices from a central location, the system comprising:
   means for sending and receiving messages, wherein the sent messages contain commands and the received messages contain responses to the commands, wherein the message comprises at least one means for packeting a message;
   a plurality of means for communicating information, the communicating means comprising:
      means for receiving messages;
      means for preparing responses to the received message; and
      means for sending the response message;
   wherein each communicating means has a unique identifying address; and
   wherein the packeting means comprises
      means for identifying intended recipients;
      means for identifying the sender;
      means for indicating a command;
      means for data transfer; and
      means for indicating potential error.

20. The system of claim 19, wherein the packeting means further comprises:
   means for indicating a length of a packet;
   means for indicating a total number of packets in a message;
   means for uniquely identifying a message;
   means for alerting the recipients to an incoming packet; and
   means for indicating an end of a packet.

21. The system of claim 20, wherein the plurality of means for communicating further comprises at least one means for integrated sensing and communicating; and
   wherein the integrated means comprises:
      one of the communicating means, wherein the preparing means further comprises means for receiving a data signal; and
      means for sensing a condition and outputting a sensed data signal to the preparing means.

22. The system of claim 21, wherein the preparing means evaluates the received message for the correct unique receiver address, identifies the command code, receives the sensed data signal, processes the sensed data signal into scalable segments and prepares the packets of the message and the sending means sends the message.

23. The system of claim 22, wherein the communicating means communicates wirelessly.

24. The system of claim 23, wherein the communicating means wirelessly communicates via radio frequency (RF).

25. The system of claim 24, wherein the communicating means wirelessly communicates via low powered RF.

26. A system for controlling geographically diverse devices from a central location, the system comprising:
   means for sending and receiving messages, wherein the sent messages comprise commands and the received messages comprise responses to the commands, wherein the message comprises at least one means for packeting a message:
   a plurality of means for communicating information, the communicating means comprising:
   means for receiving messages;
   means for preparing responses to the received message; and
   means for sending the response message;
   wherein each communicating means has a unique identifying address; and
   wherein the packeting means comprises:
      means for identifying intended recipients;
      means for identifying the sender;
      means for indicating a command;
      means for data transfer;
      means for indicating potential error;
      means for indicating a byte length of a packet;
      means for indicating a total number of packets in a message;
      means for identifying a message;
      means for alerting the recipient to an incoming packet; and
      means for indicating an end of a packet.

27. The system of claim 26, wherein the plurality of means for communicating further comprises at least one means for integrated sensing and communicating; and
   wherein the integrated means comprises:
      one of the communicating means, wherein the preparing means further comprises means for receiving a data signal; and
      means for sensing a condition and outputting a sensed data signal to the preparing means.

28. The system of claim 27, wherein the preparing means evaluates the received message for the correct unique receiver address, identifies the command code, receives the sensed data signal, processes the sensed data signal into scalable segments and prepares the packets of the message, and the sending means sends the message.

29. The system of claim 28, wherein the communicating means communicates wirelessly.

30. The system of claim 29, wherein the communicating means wirelessly communicates via radio frequency (RF).

31. The system of claim 30, wherein the communicating means wirelessly communicates via low-powered (RF).

32. The system of claim 27, wherein the plurality of means for communicating further comprises at least one means for integrated sensing, condition control, and communicating;
   wherein the integrated actuated means comprises:
      one of the communications means, wherein the preparing means further comprises means for receiving data signals and outputting control signals;
      means for sensing a first condition and outputting a sensed data signal to the preparing means; and
      means for receiving control signals and controlling a second condition in response to the received control signals.

33. The system of claim 32, wherein the preparing means evaluates the received message for the correct unique receiver address, identifies the command code, receives the sensed data signal, processes the sensed data signal into scalable segments and prepares the packets of the message, and the sending means sends the message.

34. The system of claim 33, wherein the packeting means further comprises:
   means for indicating a byte length of a packet;
   means for indicating a total number of packets in a message;
   means for uniquely identifying a message;
   means for alerting the recipient to an incoming packet; and
   means for indicating an end of a packet.

35. The system of claim 34, wherein the communicating means communicates wirelessly.

36. The system of claim 35, wherein the communicating means wirelessly communicates via radio frequency (RF).

37. A method of communicating between geographically remote devices, the method comprising:

sending a message;

receiving the message at one or more of the remote devices;

processing the message;

preparing a response message;

receiving the response message;

processing the response message wherein all messages comprise at least one packet, the packet having a predetermined format;

wherein the predetermined format comprises:

a receiver address comprising a scalable address of the at least one of the intended receiving remote devices;

a sender address comprising an unique address of the sender;

a command indicator comprising a command code;

a scalable data value comprising a scalable message; and an error detector that is a redundancy check error detector; and wherein the steps of sending and receiving are repeated until the message is received by the intended receiver.

38. The method of claim 37, wherein the predetermined format further comprises:

a packet length indicator which indicates a total number of bytes in the current packet;

a total packet indicator which indicates the total number of packets in the current message;

a current packet indicator which indicates which packet of the total packets the current packet is; and a message number, wherein the controller generates a sender message in the preformatted command message and the transceiver generates a response message number formed by a mathematical combination of the sender message number and a predetermined offset.

39. The method of claim 38, wherein preparing a response message further comprises:

receiving a data signal;

processing the data signal into scalable segments;

determining the number of segments; and preparing the response message wherein the total packet and indicator is equal to the number of segments.

40. The method of claim 39, wherein the steps of sending and receiving further comprise wirelessly sending and receiving.

41. The method of claim 40, wherein the steps of wirelessly sending further comprise wirelessly sending and receiving via radio frequency (RF).

42. The method of claim 41, wherein the steps of wirelessly sending and receiving further comprise wirelessly sending and receiving via low powered RF.

43. The method of claim 42, wherein the step of sending further comprises sending via Manchester encoding.

44. The method of claim 43, wherein the predetermined format further comprises a predetermined sequence comprising a first logic level and a subsequent sequence comprising at least two bytes of a second logic level.

* * * * *